United States Patent [19]

Albright

[11] 3,991,799

[45] Nov. 16, 1976

[54] APPARATUS AND METHOD OF FELLING AND BUNCHING TREES

[76] Inventor: Alva Z. Albright, 2909 Monroe Highway, Pineville, La. 71360

[22] Filed: Apr. 21, 1975

[21] Appl. No.: 569,627

[52] U.S. Cl. .............................. 144/34 R; 144/3 D; 144/309 AC

[51] Int. Cl.$^2$ .......................................... A01G 23/08

[58] Field of Search ................. 144/2 N, 2 Z, 34 R, 144/34 A, 34 E, 3 D, 309 AC

[56] References Cited

UNITED STATES PATENTS

| | | | |
|---|---|---|---|
| 3,747,651 | 7/1973 | Bangert et al. | 144/34 R X |
| 3,885,610 | 5/1975 | Forslund et al. | 144/34 R |

*Primary Examiner*—Leonidas Vlachos
*Assistant Examiner*—W. D. Bray
*Attorney, Agent, or Firm*—James B. Lake, Jr.

[57] ABSTRACT

Upper and lower parts of an upright structure are horizontally articulated, and the structure pivoted to a power train below the point of articulation. The axes of pivot and articulation are parallel, the upright structure being pivotable as a whole and in part past the vertical both forwardly and rearwardly with respect to the power train. The upper part comprises a tree trunk gripper longitudinally spaced from and between a pair of trunk stabilizers, and the lower part comprises a stump gripper spaced below a chain saw and sheath which are pivoted to initially engage the forward part of a tree and cut rearwardly, the cut being opened by pivoting the upper part rearwardly around the axis of articulation. All relatively movable parts are actuated by hydraulic apparatus mounted on the upright structure and connected to an auxiliary hydraulic power system of the power train. Bunching is accomplished by releasing the stump gripper from the stump of the severed tree, proceeding to a bunching area, pivoting the severed tree to a horizontal position thereover and releasing it from the trunk gripper. An hydraulic metering device triggered by a relative movement between the chain saw and its sheath permits a rapid initial engaging swing of both to be slowed to a cutting swing of the saw. The same relative movement tightens a spring connected therebetween for returning the chain saw to its sheath.

8 Claims, 6 Drawing Figures

APPARATUS AND METHOD OF FELLING AND BUNCHING TREES

BACKGROUND OF THE INVENTION

1. Field of the Invention

The invention relates generally to harvesting and bunching trees, and more particularly to an apparatus and method to accomplish this more economically and simply than heretofore.

2. Description of the Prior Art

It is old in the art to mount chain saws on power trains and to provide tree and stump grippers to assist in cutting trees.

SUMMARY OF THE INVENTION

An object of the invention is to provide a new combination of chain saw, stump and tree grippers, and tree stabilizers in new structure in which the elements of the combination interact more efficiently and economically in new functioning.

DESCRIPTION OF THE PREFERRED EMBODIMENTS

Figure 1:
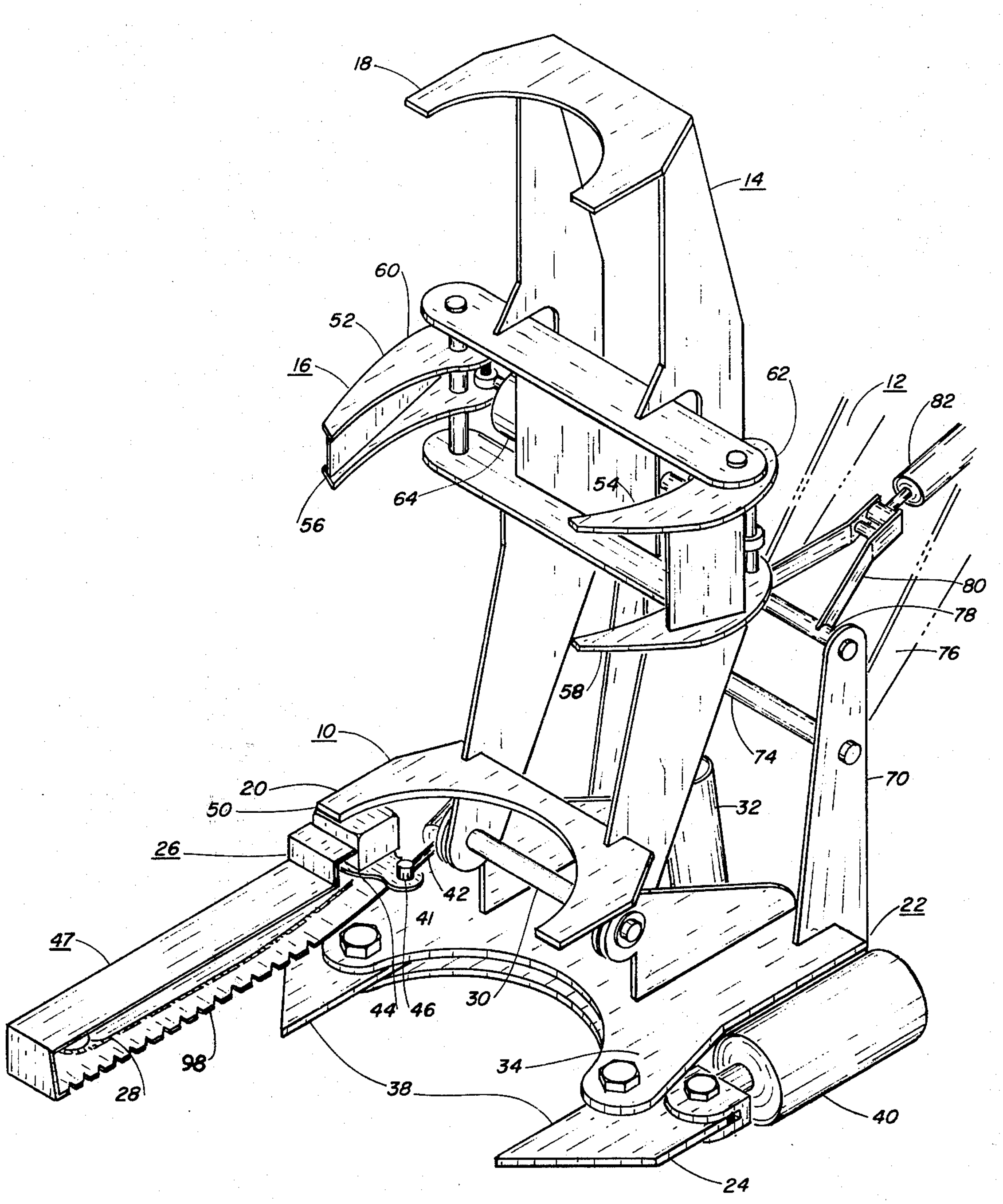
FIG. 1 is a three dimensional view of the invention showing front end attachment to a power train.
Figure 2:
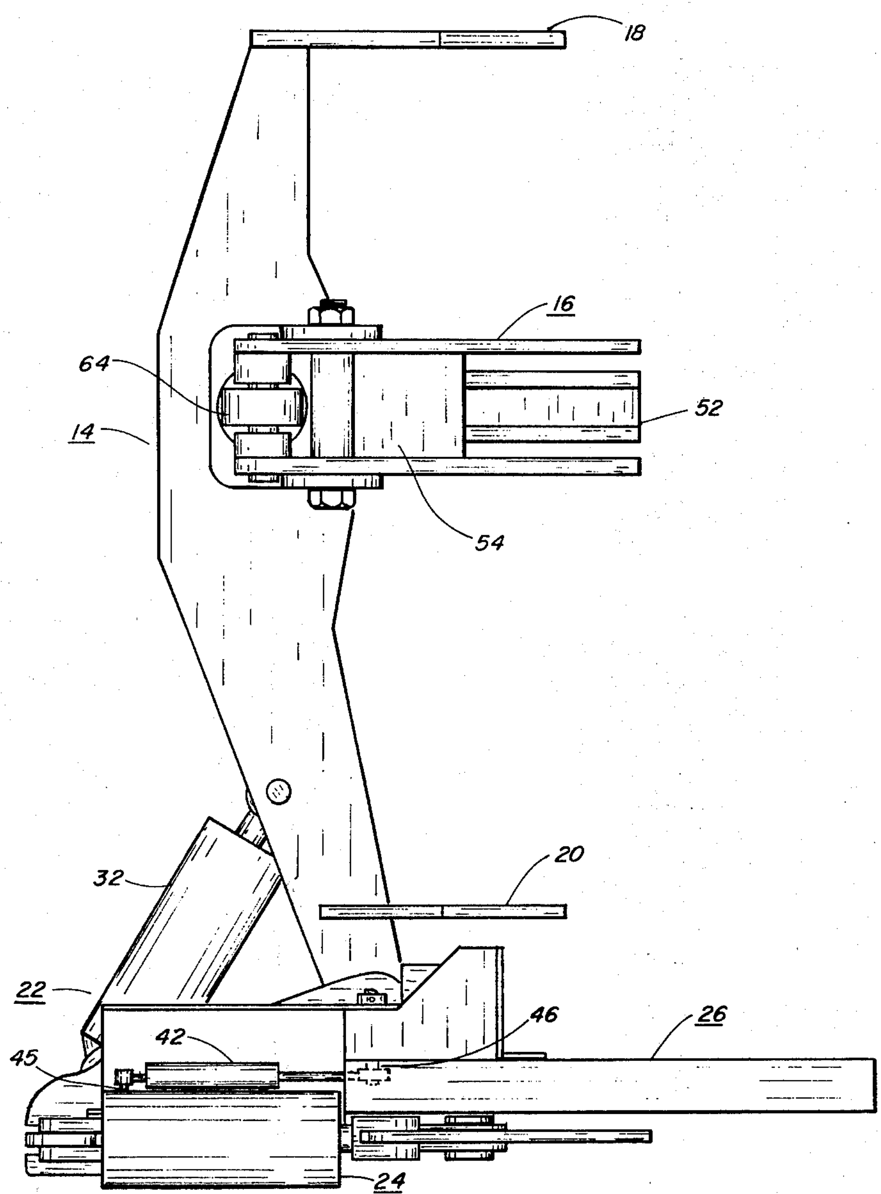
FIG. 2 is a side elevational view of the invention.
Figure 6:
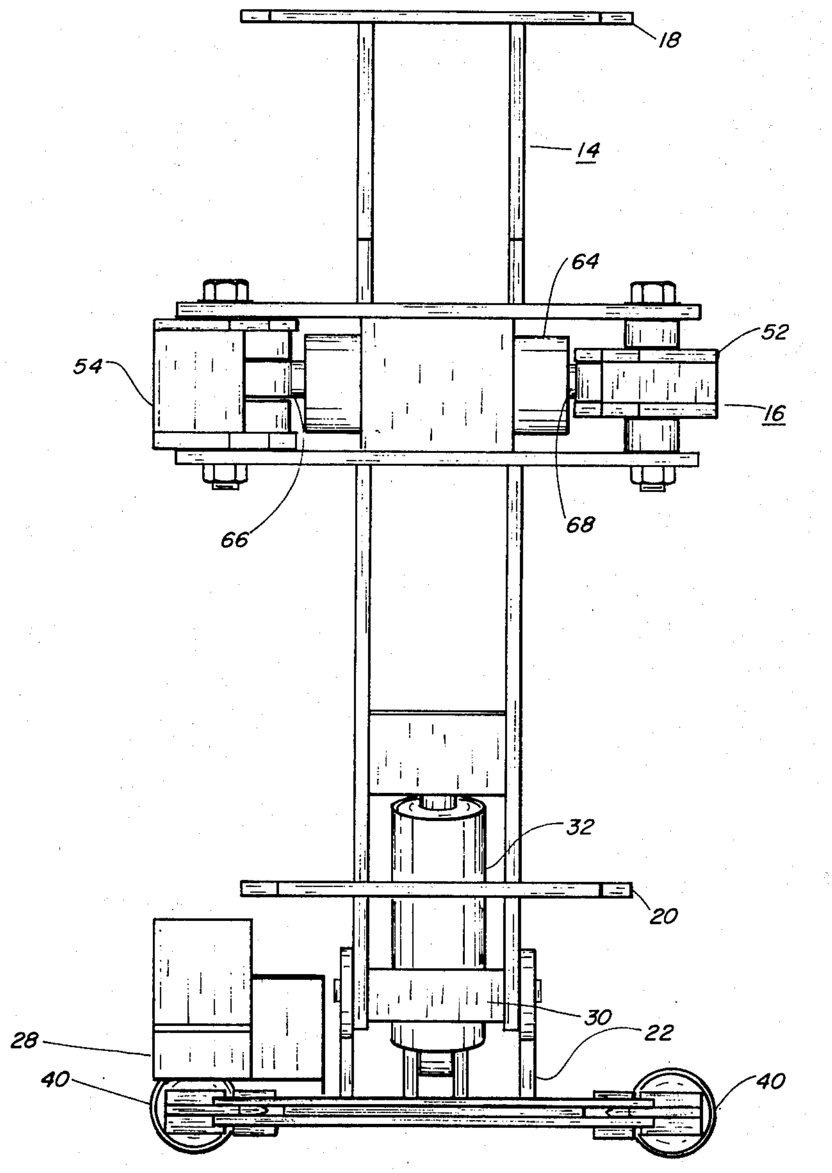
FIG. 6 is a front view of the invention less attaching means to the front end of a power train.

Referring to FIGS. 1, 2 and 6, the invention comprises an articulated upright structure 10 that is supported on the front end 12 of a power train (not shown). Structure 10 comprises an upper part 14 having a tree gripper assembly 16 and tree trunk stabilizers 18 and 20 for engaging the trunk of a tree to be severed, and a lower part 22 having at its lowest extremity a stump gripper assembly 24 for engaging what is to become the stump part of said tree, and thereabove a chain saw and sheath assembly 26. All of said assemblies are mounted facing forwardly on upright structure 10. Upper and lower parts 14 and 22 have interfitting ends that are pivoted together by transverse pivot shaft 30 immediately above a chain saw 28 of said chain saw and sheath assembly 26 to permit upper part 14 to pivot forwardly and rearwardly thereabout. An hydraulic cylinder and piston 32 is connected between said upper and lower parts 14 and 22 to effect and control this pivoting.

Figure 3:
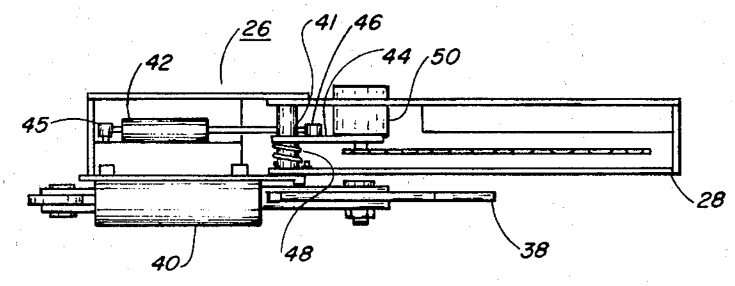
FIG. 3 is an enlarged side elevational view of the lower structure of the invention less an hydraulic metering device.
Figure 4:
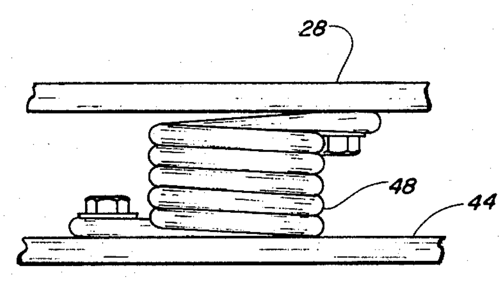
FIG. 4 is an enlarged side elevational view of a portion of FIG. 3.

More specifically in lower part 22, a stump gripper assembly 24 comprises a double plate 34 that is horizontally mounted on the lowest end of lower part 22. It defines a forward concave edge 36 (see FIG. 5) to the extremities of which gripper arms 38 are pivoted respectively. Hydraulic cylinders and pistons 40 are respectively connected between the rear ends of said arms 38 and plates 34 for closing said arms around a stump part of a tree engaged in concave edge 36 for severing. Chain saw and sheath assembly 26 are pivoted just above stump gripper assembly 24 and forwardly to a side of the top of double plates 34 and adjacent edge 36 by a pivot post 41, so that chain saw 28 will initially engage and cut an outer or forward side of a tree engaged for severing, the cut being rearwardly to sever adjacent and below transverse pivot shaft 30, said cut being opened as it is made by pivoting upper part 14 rearwardly around pivot shaft 30. An hydraulic cylinder and piston 42 is connected to double plates 34 and to a chain saw carrier plate 44 by respective pivot pins 45 and 46, said carrier plate being fixed to chain saw 26 and therewith pivotally mounted to swing chain saw 26 around pivot post 41 to cut and sever said tree. Sheath 47 of the chain saw and sheath assembly 26 is biased by spring 48 mounted between sheath 47 and saw carrier plate 44 on pivot post 41 to follow chain saw 28 around pivot post 41 and contact the tree. An hydraulic motor 50 is fixed to carrier plate 44 to drive chain saw 26 in cutting rotation. Refer to FIGS. 3 and 4.

More specifically in upper part 14, tree stabilizers 18 and 20 comprise horizontal plates respectively defining concave forward edges and being mounted on the upper and lower extremities of upper part 14 for receiving a portion of the trunk part of a tree to prevent it from swinging to right or left during and after cutting. Tree gripper assembly 16 comprises composite arms 52 and 54 having free ends 56 and 58 that intermesh when pivoted around a tree, received in the concave edges defined in the tree stabilizers 18 and 20, by their respective pivoted ends 60 and 62 actuated by a double acting hydraulic cylinder 64 and pistons 66 and 68 connected therebetween.

Connecting assembly 70 for attaching the invention to a power train (front end 12) comprises a pair of uprights 72 rigidly recessed into double plates 34. A first support bar 74 is pivoted between uprights 72 and between their longitudinal extremities for engaging attaching members 76 of power train front assembly 12. A second support bar 78 is pivoted to the upper extremities of uprights 72 parallel to the first support bar 74 and is attached by a bridle 80 to an hydraulic cylinder and piston 82 connected in power train front assembly 12 for swinging the upright structure as a whole around said first support bar 74.

Figure 5:
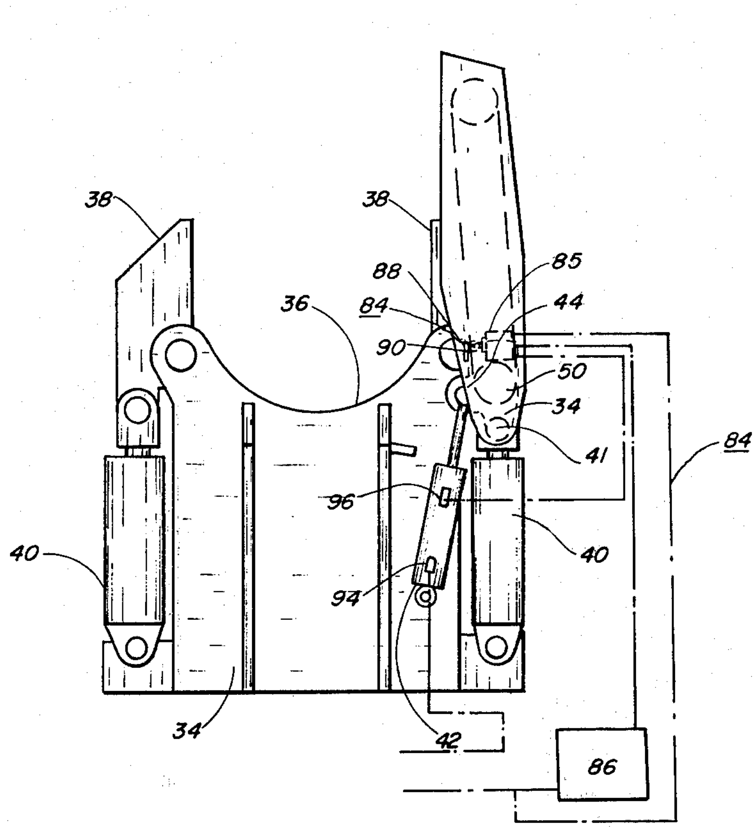
FIG. 5 is a top or plan view of the lower structure of the lower structure of the invention including hydraulic metering device.

Referring to FIG. 5, a metering device 84 for swinging said chain saw and sheath assembly 26 to rapidly engage a tree held in said stump and tree gripper assemblies and then, as sheath is stopt, slow the chain saw to a cutting swing followed by a fast return swing when the tree is cut comprises an hydraulic selector valve 85 and a flow regulator 86 (by-pass type). The selector valve is fixed to an inner surface of the sheath and a stop 88 is fixed to carrier plate 44 and adapted to engage a plunger 90 of valve 85 to keep it depressed against a spring bias (not shown) until chain saw 28 leaves sheath 47 as it (the sheath) is stopped by the tree to thereby change the output of selector valve 85 from one to another of two inputs. Flow regulator 86 is mounted on upright structure 10. Hydraulic lines as shown in FIG. 5 connect an auxiliary hydraulic power system on a power train to flow regulator 86 and by a by-pass to selector valve 85. Flow regulator 86 is also hydraulically connected to selector valve 85, while selector valve 85 is hydraulically connected to the piston end 96 of cylinder 42. Thus the two inputs to the selector valve are respectively hydraulic flow directly from the auxiliary hydraulic power system and a metered flow from the flow regulator, and the output is one or the other of these inputs.

In operation the positioning of plunger 88, by means of stop 88 and the swinging of the sheath and chain saw into cutting engagement with a tree, selects direct hydraulic flow from the auxiliary hydraulic power system for the rapid swinging of both, and selects metered hydraulic flow from the flow regulator for the slow cutting swing of the chain saw. In reversing hydraulic flow from the auxiliary power system, the flow regulator is by-passed and the swinging is rapid by both chain saw and sheath in returning from cutting engagement.

In closing it should be noted that the sheath entirely encloses the chain saw in its retracted or precutting position. The open side of the sheath has a lower edge which projects farther from the chain saw than the upper edge in order for only the lower edge to contact a tree at its prospective stationary tump part. This lower edge defines teeth 98 which bite in an opposite direction from the rotation of the chain saw in order to catch and hold vines and flexible brush for cutting.

I claim:

1. An improved apparatus for felling and bunching trees, said apparatus being mountable by attaching means fixed with an hydraulic cylinder to the forward end of a power train having an auxiliary hydraulic power system, and comprising:

a. an horizontally articulated upright structure having upper and lower parts pivotally joined end-to-end, said upper part being adapted to pivot rearwardly and forwardly on said lower part;

b. hydraulic cylinder means connected between said upper and lower parts of the horizontally articulated upright structure and to said auxiliary hydraulic power system for actuating said pivoting;

c. tree gripper assembly means fixed to and extending forwardly of said upper part of the horizontally articulated upright structure for gripping and releasing trees, and, in cooperation with the aforesaid upright structure bending trees rearwardly;

d. stump gripper and chain saw and sheath assembly fixed to and extending forwardly of said lower part of the horizontally articulated upright structure for anchoring said improved apparatus to a tree and cutting said tree rearwardly as it is so bent;

e. a connecting assembly mounted on said lower part of the horizontally articulated upright structure and comprising parallel uprights adapted to support an upper horizontal support bar and a lower horizontal support bar for said lower horizontal support bar to be pivotally engaged by said attaching means fixed to said power train, and for said upper horizontal support bar to be pivotally engaged by said hydraulic cylinder fixed to said power train.

2. An improved apparatus as described in claim 1 wherein said tree gripper assembly means comprises:

a. a tree gripper mounted intermediate the ends of and transverse to said upper part of the horizontally articulated upright structure, said tree gripper having stationary members defining parallel edges for engaging a tree, and having arms pivotally mounted between said stationary members for gripping said tree between said pivotally mounted arms and said stationary members;

b. hydraulic cylinders mounted adjacent said pivotally mounted arms and adapted to actuate the pivotally mounted arms in pivoting; and c. a pair of tree stabilizers respectively defining concave edges and mounted adjacent respective ends of the upper part of said horizontally articulated upright structure and in line with said parallel edges of the tree gripper for engaging said tree in spaced longitudinal alignment to prevent lateral swinging of said tree in said tree gripper after cutting.

3. Combination tree bending and bunching means as described in claim 2 wherein said pivotally mounted arms of said tree gripper intermesh around said tree for bending and bunching.

4. An improved apparatus as described in claim 1 wherein said stump gripper and chain saw and sheath assembly means comprise:

a. concave edges defined forwardly in the horizontally articulated upright structure's lower part for engaging a stump part of a tree therein, and forwardly extending arms mounted on said concave edges and adapted to pivot inwardly and rearwardly around said stump part of a tree; and b. chain saw and sheath assembly means pivotally mounted above, to one side, and forwardly of said stump gripper assembly means for engaging a forward side of a tree above an engagement by said stump gripper assembly means and for said chain saw and sheath assembly means to cut said tree from forward to rearward and toward said stump gripper assembly means' concave edges.

5. Chain saw and sheath assembly means as described in claim 4 wherein said chain saw and sheath assembly comprises:

a. a vertical pivot post mounted on said horizontally articulated upright structure's lower part, above and rearward of the concave edges and forwardly extending arms of said stump gripper assembly;

b. a carrier plate pivoted on said pivot post;

c. a chain saw fixed to said carrier plate for pivoting therewith parallel to the lower part of said horizontally articulated upright structure;

d. a hydraulic motor connected to said auxiliary hydraulic power supply and fixed to the carrier plate for rotating said chain saw;

e. an hydraulic cylinder mounted between said lower part of the horizontally articulated upright structure and said carrier plate and adapted to pivot said carrier plate toward the concave edges defined in said lower part of the horizontally articulated upright structure;

f. a metering device mounted on said lower part of the horizontally articulated upright structure and hydraulically connected for providing unmetered and metered hydraulic flow from said hydraulic power system for rapid swinging of said carrier plate and chain saw into engagement with a tree, to slow said chain saw swinging to cut said tree, and to swing rapidly out of engagement with said tree when its cutting is complete;

g. a sheath pivoted on said pivot post and enclosing said said chain saw on three sides, a fourth side being open for cutting and return swings of the saw chain; and h. a helical spring mounted on said pivot post and engaged between said sheath and carrier plate as the only connection therebetween, said spring being biased by the swinging of said carrier plate to swing said sheath therewith between limits established by a tree in cutting engagement and a stop on said lower part of the horizontally articulated upright structure.

6. Chain saw and sheath assembly as described in claim 5 wherein said sheath comprises:

a. a serrated projecting lower edge and a receeding upper edge defining with conforming end edges said fourth open side, said serrated edge for immobilizing flexible vines and brush for cutting with a chain saw.

7. Chain saw and sheath assembly as described in claim 5 wherein said metering device comprises:

a. a plunger operated selector valve mounted on said sheath and an actuating stop mounted on said carrier plate, said plunger and stop adapted to cooperate to select unmetered flow when chain saw is in said sheath, and to select metered flow when the chain saw is out of sheath;

b. A flow regulator mounted on said lower part; and c. hudraulic lines for connecting said flow regulator and plunger-operated selector valve to said auxiliary hydraulic power supply and hydraulic cylinder for said selector valve to select unmetered flow when said plunger is depressed by said stop and metered flow when said plunger is disengaged from said plunger.

8. A method of felling and bunching trees by means of an apparatus fixed to the forward end of a power train comprising the steps of:

a. gripping a tree in vertically spaced stump and tree grippers having an horizontal articulation therebetween;

b. stressing said tree rearward toward said power train with an hydraulic cylinder connected across said articulation;

c. cutting said tree from front to rear toward said said power train and just below said articulation and above said stump gripper, thereby opening a cut made by said chain saw and eliminating binding in said cut; and d. releasing said stump gripper and swinging said cut tree horizontal around said connecting assembly and carrying said cut tree held in said tree gripper and stabilizers to a bunching area and releasing tree gripper therefrom allowing said cut tree to fall from said stabilizers.

* * * * *